United States Patent [19]
Sato et al.

[11] Patent Number: 5,880,048
[45] Date of Patent: Mar. 9, 1999

[54] GRANULAR CERAMIC FOR WATER DEOXIDIZATION AND METHOD OF PRODUCING THE SAME

[75] Inventors: Kazuo Sato; Kazutomo Kikuchi, both of Sendai, Japan

[73] Assignee: Tohoku Bankin Toso Kogyo Kabushiki Kaisha, Sendai, Japan

[21] Appl. No.: 935,257

[22] Filed: Sep. 22, 1997

[30] Foreign Application Priority Data

Jul. 23, 1997 [JP] Japan ................................. 9-197637

[51] Int. Cl.$^6$ ............................ C04B 35/00; C04B 35/16
[52] U.S. Cl. ......................... 501/125; 501/112; 501/118; 501/119; 501/121; 501/122; 501/123; 501/127; 501/128; 501/130; 501/131; 501/141; 502/64; 502/68; 428/689; 264/66; 210/500.1; 210/503
[58] Field of Search .............................. 501/1, 123, 125, 501/128, 130, 131, 110, 112, 127, 118, 119, 121, 122, 141; 502/64, 66, 68, 69; 210/500.1, 501, 503; 264/66; 428/489

[56] References Cited

U.S. PATENT DOCUMENTS 5,178,768   1/1993   White, Jr. ............................... 210/663
5,382,416   1/1995   Nakano et al. ......................... 423/213.2
5,578,213  11/1996   Miller et al. ............................ 210/641
5,658,542   8/1997   Yoshida et al. ........................ 423/213.2

FOREIGN PATENT DOCUMENTS 408208321A   8/1996   Japan .

OTHER PUBLICATIONS

CA 126:267578, Sato et al., "Manufacture of ceramics for reduced water having lower oxidation–reduction electric potential", corresponds to JP 09048658 A2, Feb., 1997.

*Primary Examiner*—Michael Marcheschi
*Attorney, Agent, or Firm*—Paul A. Guss

[57] ABSTRACT

A ceramic and method of producing the same are disclosed, the ceramic having as principal ingredients natural zeolite and shells, wherein silver nitrate, magnesium oxide, potassium oxide, sodium oxide selenium oxide and ferric oxide are added thereto, and the resultant mixture fired to produce a granular ceramic. The granular ceramic enables the production of deoxidized water having an appropriately low oxidation reduction potential, for use as drinking water and the like.

7 Claims, No Drawings

GRANULAR CERAMIC FOR WATER DEOXIDIZATION AND METHOD OF PRODUCING THE SAME

BACKGROUND OF THE INVENTION

1. Field of the Invention

The present invention relates to a granular ceramic for water deoxidization, by which water having an oxidation reduction potential can be desirably deoxidized without requiring use of electrical or other energy sources, as well as to a method of producing such a ceramic.

2. Description of the Related Art

Along with worsening environmental conditions, pollution caused by foreign substances and the like is progressing, while the natural forms of tap water, as well as waters in lakes and marshes, are undergoing mutation. Various methods exist for measuring and evaluating the quality of such waters, one of which is a method for evaluating the quality of water by measurement of its oxidation reduction potential.

In theory, the oxidation reduction potential of water is variable between −420 and +820 mV, however well water and fresh river waters, which formerly have been used as consumable drinking (i.e. potable) water, have an oxidation reduction potential on the degree of +250 to +300 mV. In contrast to this fact, recently measured values of tap water and the like are on the order of +450 to +550 mV, and in especially high cases, are even on the order of +750 mV. The oxidation reduction potential has grown higher in this manner, and as so-called oxidized waters are used as drinking water, naturally this produces a bad effect not only for humans, but on animals and vegetables in general. Such waters also result in a cause of corrosion of iron and other metals, and furthermore bring forth bad effects upon the global environmental overall.

Formerly, in order to lessen the oxidation reduction potential of, or in other words to deoxidize, these types of oxidized waters, a method of electrical deoxidization processing has generally been employed.

However, when such a method is used on an industrial scale for producing deoxidized water in large quantities and in reasonably short periods of time, costs for equipment and modifications become high, so that the method is not cost-effective. Also, the cost of the resultant product becomes undesirably high. Furthermore, if such a method is to be used in ordinary households, one must install a specialized deoxidized water production device, resulting in the problem that operation and maintenance of such a unit is troublesome for the ordinary consumer.

SUMMARY OF THE INVENTION

A general object of the present invention is to provide a ceramic which can easily transform water having a high oxidation reduction potential, or so-called oxidized water, into deoxidized water, along with a method for producing such a ceramic.

A principal object of the present invention is to provide a ceramic which is capable of easily transforming oxidized water into deoxidized water without the use of electrical energy, together with a method of producing such a ceramic.

A further object of the present invention is to provide a ceramic for deoxidization of water, having a favorable oxidation reduction potential for use as drinking water, for promoting growth of plants and vegetables, for preventing rotting or spoilage and preserving the freshness of animal and vegetable products, as well as for rust prevention, along with a method for producing such a ceramic.

Further, a separate object of the present invention is to provide a fired ceramic for deoxidization of water having as principal ingredients natural zeolite and shells, combined with silver nitrate, magnesium oxide, potassium oxide, sodium oxide, selenium oxide and ferric oxide, together with a method of producing such a ceramic.

Furthermore, a separate object of the present invention is to provide a fired ceramic for deoxidization of water having as principal ingredients natural zeolite, shells and a silica-alumina mineral, combined with magnesium oxide, potassium oxide, sodium oxide and copper oxide, together with a method of producing such a ceramic.

The above and other objects, features and advantages of the present invention will become more apparent from the following description, in which preferred embodiments of the present invention are shown by way of illustrative examples.

DESCRIPTION OF THE PREFERRED EMBODIMENTS

The ceramic according to the first embodiment is a granular ceramic for water deoxidization prepared by firing 30 to 100 parts-per-weight of a pre-fired natural zeolite powder, 5 to 60 parts-per-weight of a pre-fired powder of shells, 3 to 8 parts-per-weight silver nitrate, 3 to 8 parts-per-weight magnesium oxide, 0.3 to 3 parts-per-weight potassium oxide, 0.3 to 3 parts-per-weight sodium oxide, 0.3 to 3 parts-per-weight selenium oxide and 0.3 to 3 parts-per-weight ferric oxide. In this case, the natural zeolite is not limited to any particular type, but types such as mordenite, clinoptilolite, and the like can be preferably employed. Further, the shells are not limited to any particular variety, however, preferable shells which may be used include, for example, oyster shells and scallop shells. As for the form of the ceramic, ceramics which are granular and have an average particle diameter of about 3 to 10 mm are preferred, because such ceramics do not suffer problems such as disruption during handling. However, the actual shape and size of the ceramics used are not limited, provided that no trouble occurs from this standpoint.

Further, the ceramic according to the second embodiment of the invention is a granular ceramic for water deoxidization prepared by firing 30 to 80 parts-per-weight of a pre-fired natural zeolite powder, 10 to 60 parts-per-weight of a pre-fired powder of shells, 5 to 30 parts-per-weight of a pre-fired silica-alumina mineral powder, 3 to 8 parts-per-weight magnesium oxide, 0.3 to 3 parts-per-weight potassium oxide, 0.3 to 3 parts-per-weight sodium oxide, and 0.3 to 3 parts-per-weight copper oxide. As for the silica-alumina mineral, appropriate minerals can be of any form, provided that they contain 70 to 90% per weight of silica and 5 to 25% per weight of alumina.

Among the structural ingredients of each of the above ceramics, concerning the combined number of additives which are in the amount of 8 parts-per-weight or less, the combination of such elements may be partially omitted, or other ingredients having analogous effects can also be substituted. For example, a selection from among any of copper oxide, molybdenum oxide, platinum, and lithium oxide could optionally be added as structural ingredients in the first ceramic, and further, the ingredients of selenium oxide or ferric oxide, and so forth, could optionally be omitted. Moreover, a selection from among any of silver oxide, selenium oxide, ferric oxide, molybdenum oxide, platinum and lithium oxide could optionally be added as structural ingredients in the second ceramic, and further, the ingredients of copper oxide, and so forth, could optionally be omitted.

The ceramic according to the first embodiment of the invention can be produced by combining the ingredients of silver nitrate, magnesium oxide, potassium oxide, sodium oxide, selenium oxide, ferric oxide, and a suitable amount of organic binder together with natural zeolite which has been pulverized to an average particle diameter of 50 $\mu$m or less and thereafter pre-fired at a temperature of 700 to 1100° C. for 4 to 40 hours, and shells which have been pulverized to an average particle diameter of 50 $\mu$m or less and thereafter pre-fired at a temperature of 1000° to 1500° C. for 10 to 200 minutes. Subsequently, after the mixed product is formed into granules, the granular material is heated at 400° to 600° C. from 2 to 14 hours, and then further fired at 800° to 1300° C. for 10 to 60 hours. In this instance, the shells, at a stage prior to the formation of granules, may also be pre-fired first with subsequent pulverization. An electric furnace or rotary kiln may appropriately be selected as the apparatus for performing firing, taking into consideration the pulverizing characteristics of the powder to be handled. The apparatus which is used for forming granules is likewise not limited to any specific structure, but for example, a rotary drum can be appropriately selected and used. An appropriate organic binder may include, for example, a glutinous starch syrup-like food additive, which is generally used when the granules are formed. The amount of organic binder which is added may be selected based on ordinary practices and usage, for example, in an amount of about several hundreds to several ten thousands ppm.

The ceramic according to the second embodiment of the invention can be produced by combining the ingredients of magnesium oxide, potassium oxide, sodium oxide, copper oxide and an appropriate amount of an organic binder together with respective fired powders of natural zeolite, shells and a silica alumina mineral, the latter three items having been fired, either separately or in a combined state, at 1000° to 1500° C. for 10 to 200 minutes, and thereafter pulverized to an average particle diameter of 50 $\mu$m or less. Subsequently, after the mixed product is formed into granules, the granular material is heated at 500° to 600° C. from 2 to 6 hours, and then further fired at 700° to 1000° C. for 10 to 48 hours. In this instance, the natural zeolite, at a stage prior to the formation of granules, need not be fired, but can also be used in an unfired state in which it has been pulverized only. Further, the natural zeolite, shells and the silica-alumina mineral, at a stage prior to the formation of granules, may also be pulverized first and then pre-fired subsequent to such pulverization.

When the ceramic of the present invention is used to produce deoxidized water, 3 to 15 parts-per-weight of the first or the second ceramic according to the invention is combined with 100 parts-per-weight of water to be processed, wherein the oxidation reduction potential of the water can be adjusted to a range of −100 to +100 mV. In this case, it is preferable if the oxidation reduction potential of the processed water is made to be at 0 mV or less. Further, the range of values of the oxidation reduction potential, in the case that oxidized water having a particularly high oxidation reduction potential (for example, +460 mV to +750 mV) is employed as a water source to be processed and deoxidized, signifies a highly suitable range of applicability, when taking into consideration the resultant properties of the deoxidized water, processing costs and the like, and the range of applicability of the present invention is not limited whatsoever in this respect.

As one exemplary use, when the ceramic of the present invention is used for preparing a culture medium for use in hydroponics, the culture medium can be made by combining 0.1 to 5 parts-per-weight of the first or second inventive ceramic with 100 parts-per-weight of water.

When the ceramic according to the present invention is used for the preservation of vegetables, fruits and the like, 3 to 15 parts-per-weight of the first or second inventive ceramic may be combined with 100 parts-per-weight of water, and after immersing the vegetables and/or fruits into to such water for 5 to 30 minutes, the vegetables, fruits and so forth can be refrigerated with advantageous effect. Depending on the type of vegetable, and the preservation conditions, the preferred range of immersion time within the deoxidized water can be departed from, being made shorter or longer, as desired. Further, the method of preservation is not limited to refrigeration, but can also be suitably applied to room temperature preservation and the like. Vegetables, and the like, are but one illustrative example of types of foodstuffs which ordinarily are objects of preservation, and similarly the immersion time in water is suggested as an illustration only. For example, the ceramic according to the present invention may also be advantageously applied in the case of tofu (bean curd), which can be preserved in a state in which it is continuously immersed in water.

When the ceramic according to the present invention is used for preventing the formation of rust in water tanks or water pipes, 3 to 15 parts-per-weight of the first or second inventive ceramic may be combined with 100 parts-per-weight of water to be treated. In this case, depending on whether the water is in a flowing or stagnant state, or other conditions of water quality, the preferred range may be departed from, and the combined amount of the ceramic can be increased or decreased. Further, water tanks and pipes are simply illustrative of metal mediums which water typically comes into contact with, and the invention is broadly applicable to many types of water treatment apparatuses and equipment.

ILLUSTRATIVE EXAMPLES

Next, a preferred example, relating to a production method using the ceramic according to the first embodiment of the present invention, shall be explained below in detail.

Natural zeolite composed principally of hardened mordenite was pulverized to an average particle size of about 2 $\mu$m, forming a powder. The powder was heated from room temperature to about 800° C. in an electric oven over roughly 6 hours, and was pre-fired while maintaining this temperature for roughly 24 hours, so as to form a pre-fired zeolite powder. Separately therefrom, shells including oyster and scallop shells were pre-fired at a temperature of about 1250° C. for approximately 3 hours using a rotary kiln. The obtained pre-fired material was pulverized to an average particle size of 2 $\mu$m, thereby forming a pre-fired powder of shells.

Next, 90 parts-per-weight of the above zeolite powder was combined and mixed with 10 parts-per-weight of the above shell powder. Then, 5 parts-per-weight of silver nitrate, 5 parts-per-weight of magnesium oxide, 1 parts-per-weight of potassium oxide, 1 parts-per-weight of sodium oxide, 1 parts-per-weight of selenium oxide and 1 parts-per-weight of ferric oxide were combined with the above mixed powders of zeolite and shells. Finally, the combined mixture was formed into granules having a diameter of 5–8 mm in a rotating drum, using a glutinous starch-syrup food additive as an organic binder.

The formed granular material was heated in an electric kiln at about 500° C. for approximately 10 hours, and further, thereafter was fired at about 1100° C. for about another 48 hours, whereby the ceramic according to the first embodiment of the present invention was obtained.

The ceramic according to the first embodiment of the invention, which was obtained as described above, was used for preparing deoxidized water. Using tap water as the water to be treated, and having an oxidation reduction potential of +420 mV, the ceramic according to the first embodiment was added to the water at a proportion of 10 parts-per-weight of the ceramic to 100 parts-per-weight of water. 1000 cc of the treated water was poured into a 1000 cc beaker, filling it to capacity, and left to sit at room temperature for 24 hours. Afterwards, the oxidation reduction potential of the water was measured at −5 mV. In a taste and quality test, the water was determined to have the same mellowness and delicious taste as natural spring water. After processing, the measured water quality rose from a pH level of 7.7 to 10.1. Further, sodium and calcium mineral contents doubled, and it was determined that favorable deoxidized water, making excellent drinking water, was obtained.

Next, the ceramic according to the first embodiment was used for preparing a hydroponic culture medium. A commercially available hydroponic culture medium was obtained, wherein 1 parts-per-weight of the ceramic according to the first embodiment of the invention was added to 100 parts-per-weight of the hydroponic medium. Hyacinth bulbs were grown hydroponically therewith, and compared with similarly grown bulbs yet without using the inventive ceramic. Based on this comparison, the amount of matured hyacinth bulbs grown in the culture medium employing the ceramic according to the first embodiment of the invention was 50% greater, and the development of leaves and flowering was faster.

In addition, the ceramic according to the first embodiment of the invention was used for preprocessing when storing vegetables. More specifically, 5 parts-per-weight of the ceramic according to the first embodiment of the invention was combined with 100 parts-per-weight of tap water, and after immersing shredded cabbage in such water for ten minutes, the cabbage was stored in a refrigerator for five days. Confirming the condition after five days, the freshness of the cabbage was not deteriorated whatsoever. In contrast, cabbage which had been immersed in water that was not processed as described above became wilted and stale within three days.

Further, apart from this test, tofu was preserved in an immersed state in water which included the ceramic according to the first embodiment of the invention, which compared with tofu stored in water not having the ceramic added thereto, had the effect of being kept in an edible condition over 10 times longer.

Next, the rust preventative effects using the ceramic according to the first embodiment of the invention were confirmed. Processed water, made up of 5 parts-per-weight of the ceramic according to the first embodiment combined with 100 parts-per-weight of tap water was prepared, along with tap water which, for comparative purposes, had not been processed using the inventive ceramic. Iron nails were placed respectively in each of the treated and untreated waters at room temperature. A few hours after immersion, rust began to develop on the iron nails which were immersed in the water which had not been treated with the inventive ceramic, and after five days, rust had completely covered the surface of the iron nails. By contrast, iron nails immersed in water which had been treated using the ceramic according to the first embodiment exhibited no increase in rust, beyond the small amount of rust that had existed on the nails directly after immersion.

Next, a preferred example, relating to a production method using the ceramic according to the second embodiment of the present invention, shall be explained below in detail.

Natural zeolite composed principally of hardened mordenite was pulverized to an average particle size of about 2 $\mu$m, forming a powder. Separately therefrom, shells including oyster and scallop shells were pre-fired at a temperature of about 1300° C. for approximately 2 hours using a rotary kiln, and the obtained pre-fired material was pulverized to an average particle size of 2 $\mu$m, thereby forming a pre-fired powder of shells. Further, a clay mineral, containing roughly 80% per weight silica and roughly 15% per weight alumina, was processed under the same conditions as the shells, thereby obtaining a pre-fired silica-alumina mineral powder in the same manner.

Next, 55 parts-per-weight of the above zeolite powder, 25 parts-per-weight of the shell powder and 13 parts-per-weight of the silica-alumina mineral powder were combined together and mixed. Then, 5 parts-per-weight of magnesium oxide, 1 parts-per-weight of potassium oxide, 0.5 parts-per-weight of sodium oxide and 0.5 parts-per-weight of copper oxide were combined with the mixed powder of zeolite, shells and silica-alumina mineral. Finally, the combined mixture was formed into granules having a diameter of 5–8 mm in a rotating drum, using a glutinous starch-syrup food additive as an organic binder.

The formed granular material was heated in an electric kiln at about 570° C. for approximately 3 hours, and further, thereafter was fired at about 800° C. for another 20 hours, whereby the ceramic according to the second embodiment of the present invention was obtained.

The ceramic according to the second embodiment of the invention, which was obtained as described above, was used for preparing deoxidized water. Using tap water as the water to be treated, and having an oxidation reduction potential of +520 mV, the ceramic according to the second embodiment was added to the water at a proportion of 10 parts-per-weight of the ceramic to 100 parts-per-weight of water. 1000 cc of the treated water was poured into a 1000 cc beaker, filling it to capacity, and left to sit at room temperature for 24 hours. Afterwards, the oxidation reduction potential of the water was measured at +15 mV, enabling favorable deoxidized water to be obtained. Further, the second inventive ceramic achieved similar remarkable effects as the first ceramic with respect to enhancing the effectiveness of hydroponic culture media, vegetable preservation, rust prevention, and the like.

What is claimed is:

1. A fired granular ceramic for water deoxidization comprising 30 to 100 parts-per-weight of a pre-fired natural zeolite powder, 5 to 60 parts-per-weight of a pre-fired powder of shells, 3 to 8 parts-per-weight silver nitrate, 3 to 8 parts-per-weight magnesium oxide, 0.3 to 3 parts-per-weight potassium oxide, 0.3 to 3 parts-per-weight sodium oxide, 0.3 to 3 parts-per-weight selenium oxide and 0.3 to 3 parts-per-weight ferric oxide.

2. A fired granular ceramic for water deoxidization comprising 30 to 80 parts-per-weight of a pre-fired natural zeolite powder, 10 to 60 parts-per-weight of a pre-fired powder of shells, 5 to 30 parts-per-weight of a pre-fired silica-alumina mineral powder, 3 to 8 parts-per-weight magnesium oxide, 0.3 to 3 parts-per-weight potassium oxide, 0.3 to 3 parts-per-weight sodium oxide, and 0.3 to 3 parts-per-weight copper oxide.

3. A method of producing a granular ceramic for water deoxidization, said ceramic comprising a fired granular ceramic for water deoxidization comprising 30 to 100 parts-per-weight of a pre-fired natural zeolite powder, 5 to 60 parts-per-weight of a pre-fired powder of shells, 3 to 8 parts-per-weight silver nitrate, 3 to 8 parts-per-weight magnesium oxide, 0.3 to 3 parts-per-weight potassium oxide, 0.3 to 3 parts-per-weight sodium oxide, 0.3 to 3 parts-per-weight selenium oxide and 0.3 to 3 parts-per-weight ferric oxide, comprising the steps of:

pulverizing natural zeolite to have an average particle diameter of 50 $\mu$m or less, and pre-firing said natural zeolite at a temperature of 700° to 1100° C. for 4 to 40 hours;

pulverizing shells to have an average particle diameter of 50 $\mu$m or less, and pre-firing said shells at a temperature of 1000° to 1500° C. for 10 to 200 minutes;

mixing said natural zeolite and said shells together with silver nitrate, magnesium oxide, potassium oxide, sodium oxide, selenium oxide, ferric oxide, and an organic binder to form granules;

firing said granules at a temperature of 400° to 600° C. for 2 to 14 hours; and further firing said granules at a temperature of 800° to 1300° C. for 10 to 60 hours.

4. A method of producing a granular ceramic for water deoxidization, said ceramic comprising 30 to 80 parts-per-weight of a pre-fired natural zeolite powder, 10 to 60 parts-per-weight of a pre-fired powder of shells, 5 to 30 parts-per-weight of a pre-fired silica-alumina mineral powder, 3 to 8 parts-per-weight magnesium oxide, 0.3 to 3 parts-per-weight potassium oxide, 0.3 to 3 parts-per-weight sodium oxide, and 0.3 to 3 parts-per-weight copper oxide, comprising the steps of:

either in a mixed state or separately, pre-firing natural zeolite, shells, and a silica-alumina mineral at a temperature of 1000° to 1500° C. for 10 to 200 minutes;

pulverizing said natural zeolite, said shells and said silica-alumina mineral to have an average particle diameter of 50 $\mu$m or less;

mixing said natural zeolite, said shells and said silica-alumina mineral together with magnesium oxide, potassium oxide, sodium oxide, copper oxide, and an organic binder to form granules;

firing said granules at a temperature of 500° to 600° C. for 2 to 6 hours; and further firing said granules at a temperature of 700° to 1000° C. for 10 to 48 hours.

5. The method of producing a granular ceramic for water deoxidization according to claim 3, wherein said shells are first pre-fired and later pulverized.

6. The method of producing a granular ceramic for water deoxidization according to claim 4, wherein said natural zeolite is in a non-fired condition during said mixing step.

7. The method of producing a granular ceramic for water deoxidization according to claim 4, wherein said natural zeolite, said shells and said silica-alumina mineral are first pulverized and later pre-fired.

* * * * *